United States Patent
Agarwal et al.

(10) Patent No.: US 9,762,707 B2
(45) Date of Patent: *Sep. 12, 2017

(54) MANAGEMENT OF OUTBOUND TRANSACTIONS TO AN ENTERPRISE INFORMATION SYSTEM

(71) Applicant: INTERNATIONAL BUSINESS MACHINES CORPORATION, Armonk, NY (US)

(72) Inventors: Matu Agarwal, Kanpur (IN); Anket Jain, Sagar (IN)

(73) Assignee: International Business Machines Corporation, Armonk, NY (US)

( * ) Notice: Subject to any disclaimer, the term of this patent is extended or adjusted under 35 U.S.C. 154(b) by 393 days.

This patent is subject to a terminal disclaimer.

(21) Appl. No.: 13/924,729

(22) Filed: Jun. 24, 2013

(65) Prior Publication Data

US 2014/0379849 A1 Dec. 25, 2014

(51) Int. Cl.
*H04L 29/06* (2006.01)
*H04L 29/08* (2006.01)

(52) U.S. Cl.
CPC .......... *H04L 69/28* (2013.01); *H04L 67/2833* (2013.01)

(58) Field of Classification Search
CPC ........................ H04L 69/28; H04L 67/2833
See application file for complete search history.

(56) References Cited

U.S. PATENT DOCUMENTS

| | | | |
|---|---|---|---|
| 7,313,575 B2 | 12/2007 | Carr et al. | |
| 7,315,980 B2 | 1/2008 | Anderson et al. | |
| 7,757,242 B2 | 7/2010 | Khan et al. | |
| 8,205,007 B2 | 6/2012 | Surma et al. | |
| 2005/0071469 A1* | 3/2005 | McCollom | H04L 67/1002 709/225 |
| 2007/0177626 A1* | 8/2007 | Kotelba | 370/468 |
| 2007/0185746 A1 | 8/2007 | Chieu et al. | |
| 2012/0137306 A1 | 5/2012 | Sarferaz et al. | |
| 2013/0215850 A1* | 8/2013 | Zakrzewski | 370/329 |

OTHER PUBLICATIONS

P. Mell et al., "The NIST Definition of Cloud Computing", National Institute of Standards and Technology, Information Technology Laboratory, Special Publication 800-145, Sep. 2011, pp. 1-7.
Stefanos Koukoulas, Ed., "D7.7—ERP Mediation Devices Software Architecture", VISP Consortium, Information Society Technologies, May 29, 2007, pp. 1-90.
Stefan Kostial et al., "Oracle (R) Fusion Middleware", Oracle, Nov. 2010, pp. 1-416.

* cited by examiner

*Primary Examiner* — Larry Donaghue
(74) *Attorney, Agent, or Firm* — Law Office of Jim Boice

(57) ABSTRACT

A system, method, and/or computer program product manages outbound transactions in a computing environment. At least one communication request is received during a pre-defined time period. The at least one communication request is processed to result in at least one processed data. A packet comprising the at least one processed data corresponding to the received at least one communication request is generated responsive to satisfying at least one pre-defined condition. The packet is delivered to an enterprise information system (EIS) within the computing environment.

7 Claims, 6 Drawing Sheets

MANAGEMENT OF OUTBOUND TRANSACTIONS TO AN ENTERPRISE INFORMATION SYSTEM

BACKGROUND

The present disclosure relates to outbound transactions, and more specifically, to outbound transactions to an enterprise information system (EIS).

Communication over the Internet and similar computer networks where components and communication pathways have a tendency to change more easily lends itself to loosely coupled connections using service oriented architectures (SOA). Loose coupling describes a relationship between two or more computer systems exchanging data where each end of a communication or transaction makes its requirements explicit and makes few assumptions about the other end. Loose coupling lends itself to replaceable components within or at either end of a communication pathway.

SOA is a perspective of software architecture where services are used to support the requirements of software users. Nodes in an SOA environment make resources available to other participants in the network as independent services that a participant may use in a standardized way. Services interoperate based on a formal definition, or contact, which is independent from the underlying platform and programming language. Software components are reusable and replaceable because the interface is standards-compliant and independent of the underlying implementation of the service. SOA can support integration with a complex enterprise information system (EIS).

An EIS is a complex computing system that supports a high quality of service, usually dealing with large volumes of data, and is capable of supporting a large organization, such as a banking system or a large retail chain. Examples of enterprise information systems are Oracle®, PeopleSoft®, and SAP®. SAP is a program used for managing business information, customer relations, supply chains, human resources, and product lifecycles, among other services. SAP and other enterprise information systems may exchange information with other enterprise information systems. Application servers facilitate information exchange. An example of an application server is the WebSphere® Process Server (WPS). In general, an application server includes an adapter to interface with an enterprise information system, such as SAP, with another enterprise information system or for a client application.

One form of communication between enterprise information systems is that of a transaction. A transaction involves a related collection of operations. A transaction has the properties of atomicity, consistency, isolation, and durability. Atomicity means that all of the operations are applied or none of them are applied. For example, in a financial transaction, a credit to one account and debit to another account must both be applied or neither applied. Consistency means that the transaction represents a correct transformation of the application state. For example, in a financing, the sum of all asset accounts must equal the sum of all liabilities. Isolation means that the effects of one transaction do not affect other transactions executing concurrently. Durability means that once a transaction successfully completes, changes to the application will survive failures. This is usually accomplished through backing up data and error recovery.

One method for communicating with an SAP application is to use a form of the remote function call ("RFC") protocol. Transactional RFC ("tRFC") protocol is used for asynchronous transactions. SAP applications may use the application link enabling ("ALE") interface or a similar interface for processing asynchronous transactions. Transactions may be inbound or outbound. Outbound transactions with an SAP application are from the perspective of an adapter in communication with the SAP application and cover transactions transmitted to the SAP application from the adapter.

SUMMARY

A system, method, and/or computer program product manages outbound transactions in a computing environment. At least one communication request is received during a pre-defined time period. The at least one communication request is processed to result in at least one processed data. A packet comprising the at least one processed data corresponding to the received at least one communication request is generated responsive to satisfying at least one pre-defined condition. The packet is delivered to an enterprise information system (EIS) within the computing environment.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
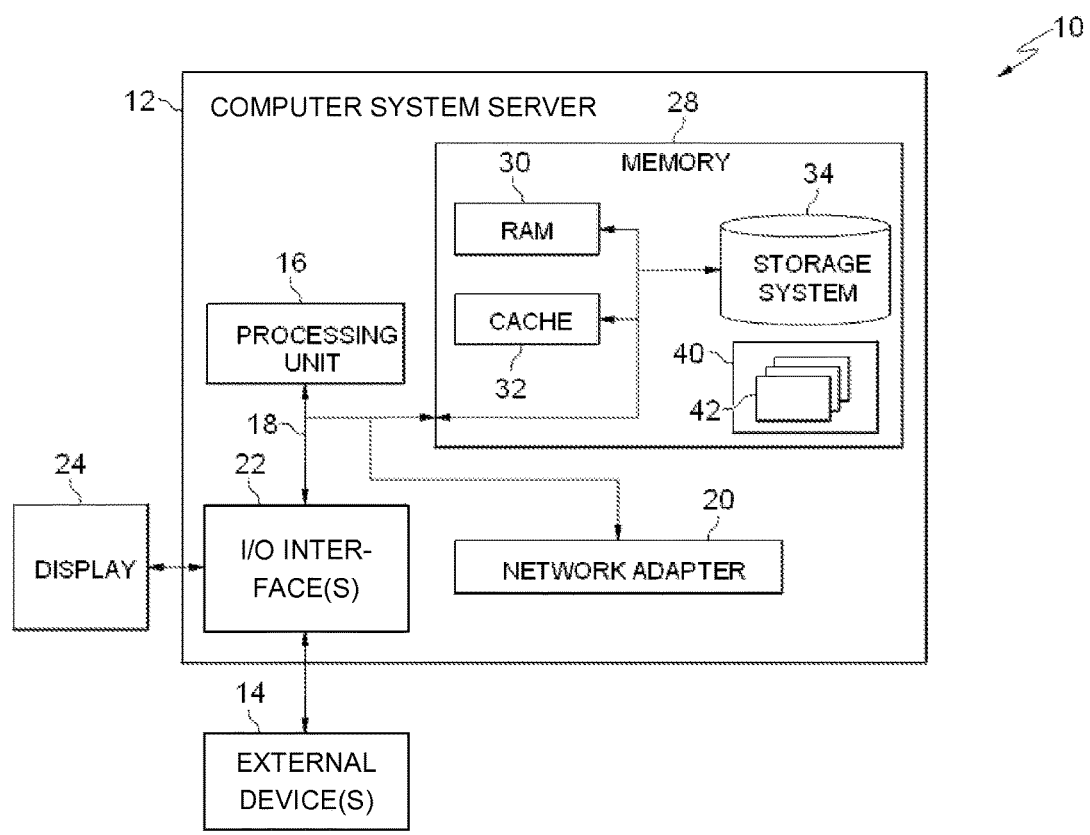
FIG. 1 depicts a cloud computing node according to an embodiment of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
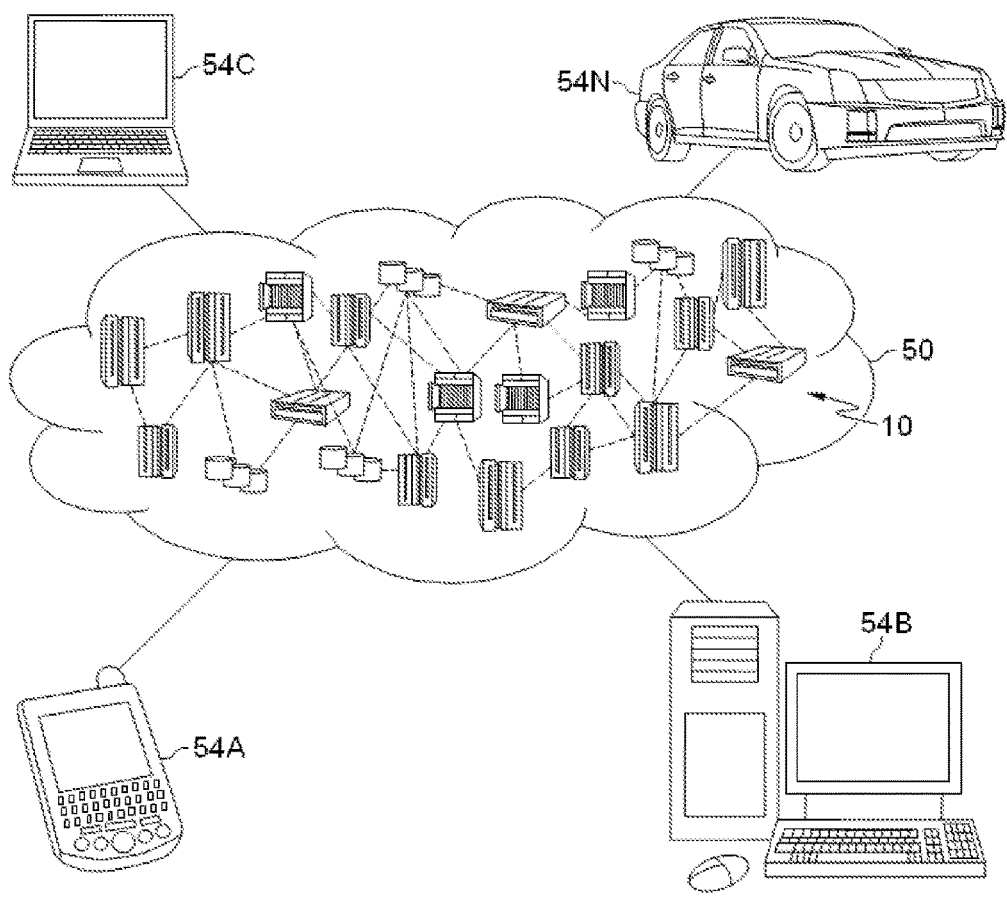
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
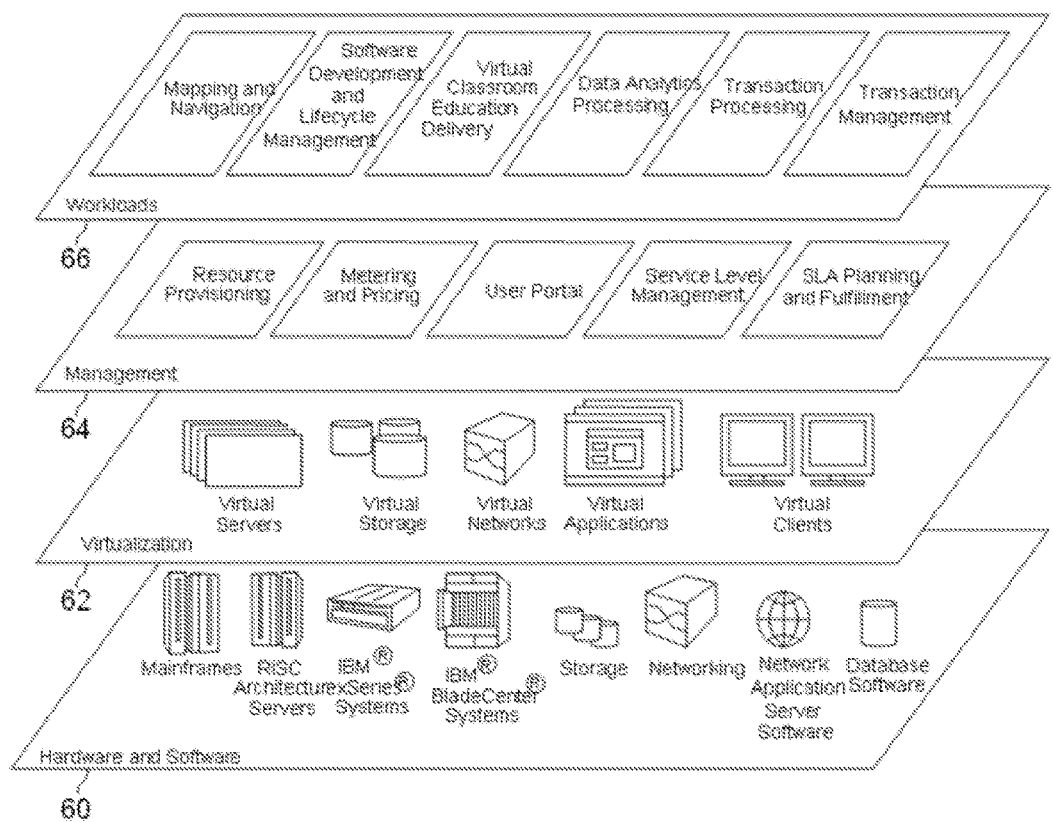
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing;

transaction processing. Further shown in the workloads layer 66 is transaction management, which represents the functionality that is provided under the embodiments of the present invention.

It is understood that all functions of the present invention as described herein typically may be performed by the transaction management (workloads layer 66, which can be tangibly as modules of program code 42 of program/utility 40 of FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment known now or later developed.

Figure 4:
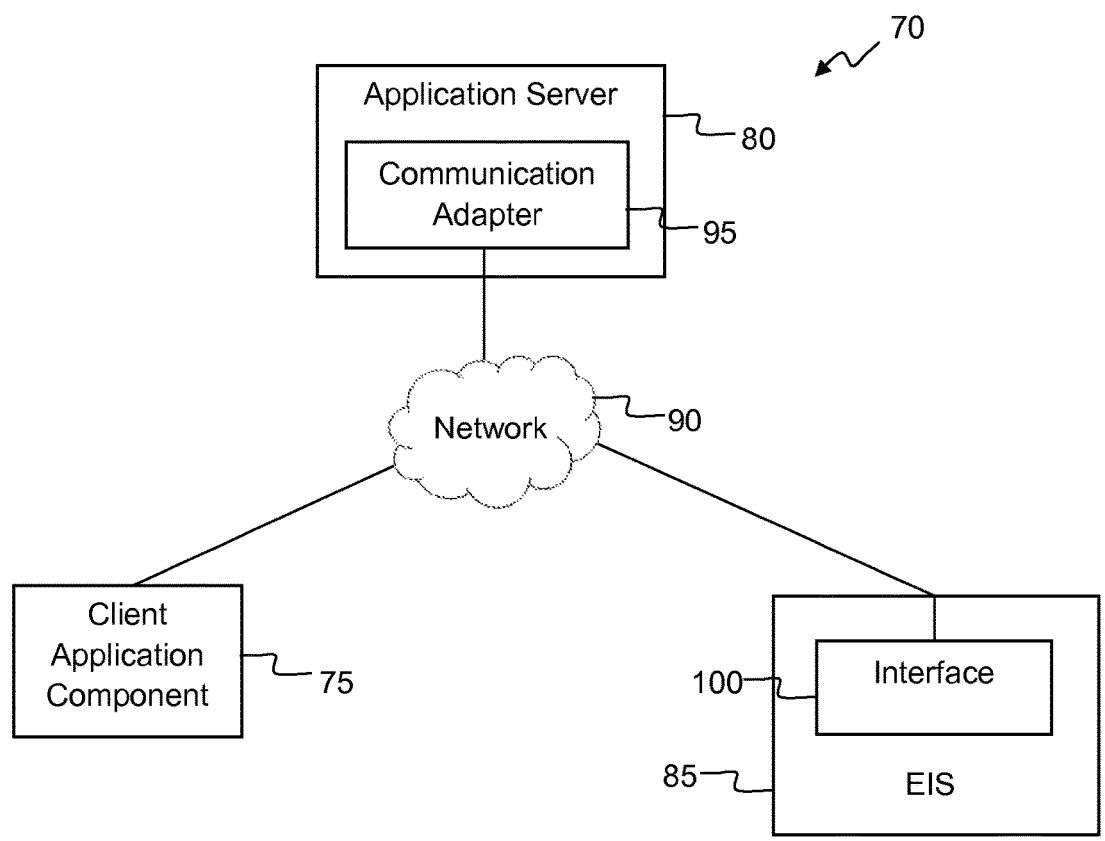
FIG. 4 depicts a system for managing outbound transaction in service orientated architecture according to an aspect of the present invention is shown.

With reference now to FIG. 4 a system 70 for managing outbound transactions in service orientated architecture (SOA) according to an aspect of the present invention is shown. As depicted, a client application component 75, an application server 80 and an enterprise information system (EIS) 85 are shown. In general, the client application component 75 can be implemented as program 40 of FIG. 1 on any type of the computing devices 54A-N of FIG. 2. In the shown example of FIG. 4, the client application component 75 is operably coupled to application server 80 using a network 90. However, in another aspect, the client application 75 may be running on the application server 80. The application server 80 comprises a communication adapter 95. The communication adapter 95 is loosely coupled to an interface 100 of the EIS through the network 90.

In general, the application server 80 is a form of middleware that facilitates connection between a client application component 75 and the EIS 85 or EIS 85 and another EIS. Examples of the application server 75 are the WebSphere® Application Server ("WAS") from IBM®, the BEA WebLogic Server®, the SAP NetWeaver®. In the shown example of FIG. 4, the EIS 85 is a SAP application, a proprietary EIS from SAP AG. The interface 100 in this case is a SAP interface. One version of SAP is SAP R/3. The EIS 85 may comprise one or more applications running on the EIS 85. The client application component 75 may handle financial data, inventory, order tracking, or the like. The client application component 75 has the ability to generate transactions that involve transmitting data to the EIS 85.

The EIS 85, through the interface 100, and the client application component 75, through the communication adapter 95, are loosely coupled through the network 90. The network 90 may be any communication network supporting asynchronous transactions and loose coupling. The network 90 may be a local area network (LAN), a general wide area network (WAN), and/or a public network (e.g., the Internet) or a combination of networks, etc.

Typically, SAP applications, handle asynchronous transactions using the tRFC protocol through SAP interface. In general, the interface 100 is provided by the provider of the EIS 85 for the exchange of business data between loosely-coupled EIS applications. For example, the SAP interface is provided by SAP AG. In general, the RFC protocol is used for communication with an on-premise SAP application. For a client application component hosted as a cloud computing node (e.g., as the cloud computing node 10 in FIG. 2), a connector may be required for communication with an on-premise EIS. The vehicle for data transfer with SAP application through SAP interface is an intermediate document (IDoc). An IDoc is a container for the application data to be transmitted. In general, the application data from the client application component 75 is transmitted to the interface 100 of the EIS 85 through the communication adapter 95. The communication adapter 95 is configured to receive communication requests from the client application component 75, process the communication request to result into processed data. The processed data is provided by the communication adapter 95 to the interface 100 for communication between the client application component 75 and the EIS 85. For example, in aspects of SAP application, the communication request is received by the communication adapter 95 and the communication adapter 95 processes the communication request resulting into IDoc.

According to an aspect of the invention, the communication adapter 95 is configured to wait for a time period and receive the communication requests from the client application component 75 during the time period the communication adapter 95 is waiting. The communication requests received by the communication adapter 95 are processed resulting into processed data. According to an aspect, the communication requests received are processed during the time period the communication adapter 95 is waiting. This provides the advantage of processing the communication requests during the time period the communication adapter 95 is waiting and thus achieve in increasing the throughput of the communication adapter 95. The processed data corresponding to the communication requests processed are provided to the EIS 85 as a packet via asynchronous communication responsive to satisfying at least one condition. The communication adapter 95 waiting for the time period and delivering the packet comprising the processed data to the EIS responsive to staying at least condition is hereinafter referred to as a cycle.

In an aspect, the time period of waiting is updated dynamically for each cycle. To achieve this, the communication adapter 95 is configured to update the time period of waiting for each cycle dynamically. In an embodiment, the communication adapter 95 may be configured to update the time period of waiting for a current cycle as a function of the immediate preceding cycle. In an example, the communication adapter 95 may update the time period $(T_{w-1})$ of the preceding cycle responsive to the number of communication requests received during the immediate preceding cycle to obtain the time period $(T_w)$ of waiting for the current cycle. In another example, the time instance of reception of each of the communication requests received by the communication adapter 95 during the immediate preceding cycle may also be used for updating the time period $(T_{w-1})$ of the preceding cycle to obtain the time period $(T_w)$ of waiting for the current cycle. Thus, the time period of waiting for a current cycle is updated iteratively as a function of the immediate preceding cycle. Initially, the time period can be computed by the communication adapter 95 or can be provided by a user as an input. Thereafter, the time period is updated dynamically by the communication adapter 95 for each subsequent cycle. Thus, the time period of waiting for each cycle may be pre-defined.

According to an aspect, the communication adapter 95 is configured to generate a packet comprising the processed data responsive to satisfying at least one condition. The conditions may be pre-defined. For example, the conditions may be pre-defined by a user. Thus, the communication adapter 95 is configured to receive a communication request and process the communication request resulting into a processed data during the time period the communication adapter 95 is waiting. According to an aspect, the processed data may be stored at a memory operably coupled to the application server 80. This operation is performed until one of the conditions is satisfied. On one of the conditions being satisfied, the communication adapter 95 is configured to generate the packet comprising one or more processed data and deliver the packet to the EIS 85. Thus, the packet may comprise one or more processed data corresponding to the communication requests received and processed during the waiting time period. For example, for SAP application, the communication request may be IDoc request and the processed data may be IDoc. The packet comprising one or more IDocs corresponding to the IDoc requests processed during the waiting time period is generated responsive to satisfying one or more conditions.

According to an aspect, the conditions may be derived as a function of the summation of the sizes of the processed data and/or the time period. The communication adapter 95 is configured to determine at each cycle if at least one condition is satisfied and generate the packet comprising the processed data for delivery to the EIS 85 responsive to satisfying at least one condition. In an aspect, the condition may include determining if the time period of waiting for the current cycle is greater than a threshold time period. In another aspect, the condition may include determining if the summation of the sizes of the processed data is greater than a threshold size. In yet another aspect, the condition may include determining if the time period for the current cycle has expired. The generated packet comprising the processed data is delivered to the EIS 85 by communication adapter 95. According to an aspect, the threshold size and the threshold time period may be provided as an input by a user. According to another aspect, the threshold size and the threshold time period may be computed by the communication adapter 95.

Figure 5:
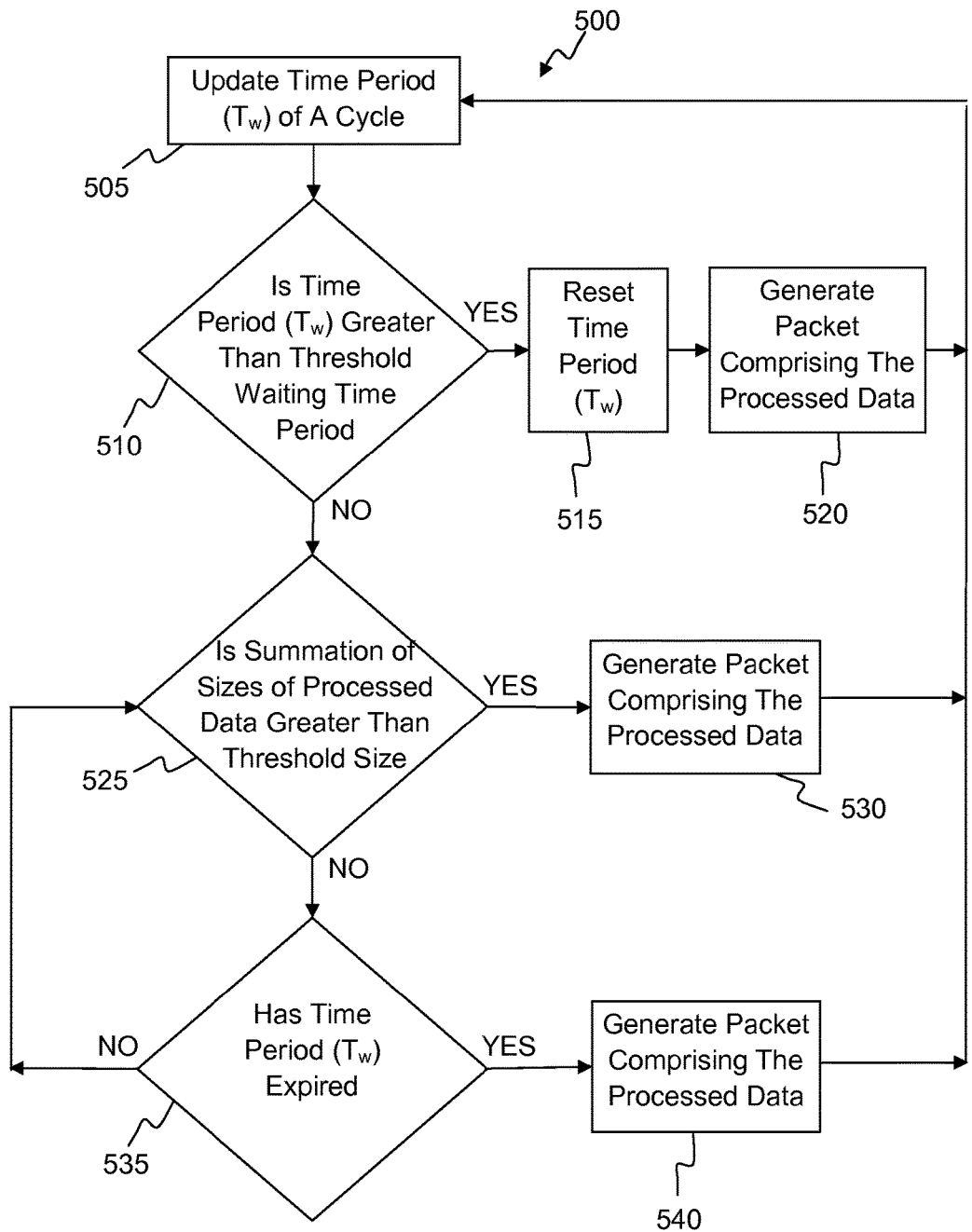
FIG. 5 depicts an exemplary flow for a process for a cycle for generating a packet responsive to satisfying at least one condition according to aspects of the present invention.

FIG. 5 with reference to FIG. 4 depicts an exemplary flow for a process 500 for a cycle for generating a packet responsive to satisfying at least one condition according to aspects of the present invention. In embodiments, the process can be performed by the communication adapter 95 of FIG. 4.

At step 505, the communication adapter, (e.g., the communication adapter 95 in FIG. 4) is configured to update the time period ($T_w$) of waiting for a current cycle as a function of the immediate preceding cycle. The updating of the time period ($T_w$) can be mathematically expressed by the following equation.

$$T_w = T_{w-1} + \delta \quad (1)$$

where, $T_w$ is the time period of waiting of a current cycle, $T_{w-1}$ is the time period of waiting of an immediate preceding cycle and $\delta$ is the value by which the time period $T_{w-1}$ is to be incremented.

According to an aspect, the communication adapter 95 is configured to compute the value of $\delta$ dynamically responsive to the number of communication requests received during the immediate preceding cycle. Thus, the time period ($T_w$) for a current cycle will be an increment of the time period ($T_{w-1}$) of the immediate preceding cycle by a value $\delta$. According to an aspect, the value assigned to $\delta$ is high if the number of communication requests received during the immediate preceding cycle is low and is low if the number of communication request received is high. Thus, the time period ($T_{w-1}$) of waiting of the immediate preceding cycle will be incremented by a higher value in case the number of communication requests received in the immediate preceding cycle is low and vice versa.

At step 510, the communication adapter is configured to determine if the time period ($T_w$) is greater than the threshold time period. If the time period ($T_w$) is greater than the threshold time period, at step 515, the communication adapter is configured to reset the time period ($T_w$). For example, in an aspect, the time period ($T_w$) may be reset to the initial value. At step 520, the communication adapter is configured to generate the packet comprising the processed data. If, at step 510, the time period ($T_w$) is not greater than the threshold time period, then, at step 525, the communication adapter 95 is configured to determine if the summation of sizes of the processed data is greater than a threshold size. If the summation of sizes of the processed data is greater than the threshold size, the communication adapter, at step 530 generates the packet comprising the processed data. This achieves in keeping a check on the size of the packet. If the summation of sizes of the processed data is not greater than the threshold size, at step 535, the communication adapter is configured to determine if the time period ($T_w$) of the current cycle has expired. If the time period ($T_w$) of the current cycle has expired, at step 540, the communication adapter is configured to generate the packet comprising the processed data.

If the time period ($T_w$) of waiting of the current cycle has not expired, then, the step 525 is repeated. Thus, the conditions of step 525 and step 535 are monitored in a continuous manner. The condition at step 510 is not monitored in a continuous manner as this can be determined at one instance itself.

Figure 6:
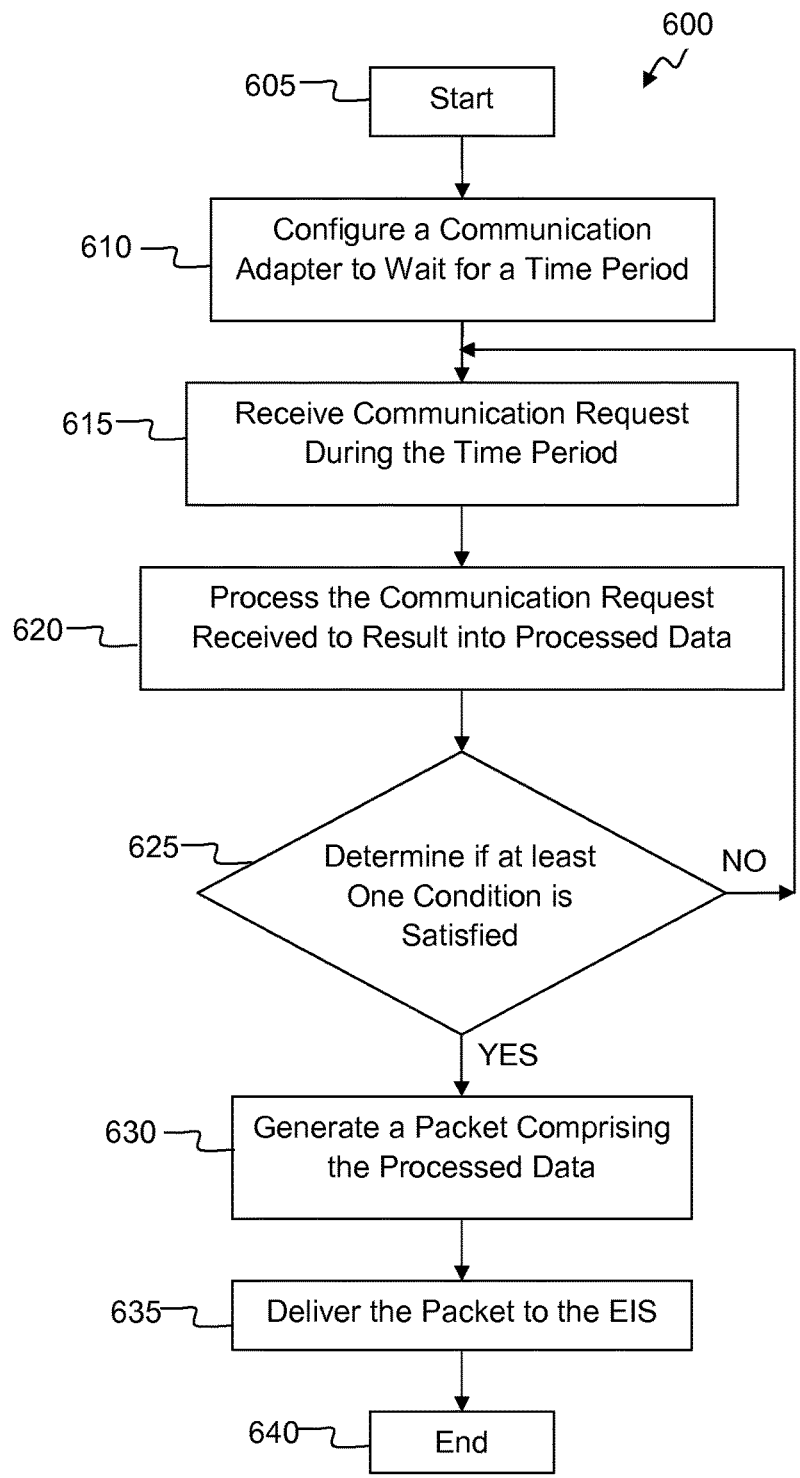
FIG. 6 depicts an exemplary flow for a process 600 in accordance with aspects of the present invention.

FIG. 6 shows an exemplary flow for performing aspects of the present invention. The steps of FIG. 6 may be implemented in the environment of FIGS. 1-4, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIGS. 1-5. For the purposes of this description, a computer-usable or computer readable medium can be any apparatus that can contain and store the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 6 depicts an exemplary flow for a process 600 in accordance with aspects of the present invention. In embodiments, the process 600 can be performed by the communication adapter 95 in FIG. 4.

At step 605, the process starts. At step 610, the communication adapter (e.g., the communication adapter 95 in FIG. 4) is configured to wait for a time period. The time period of waiting for each cycle may be pre-defined. In an aspect, the time period may be computed by the communication adapter. In another aspect, the waiting time period may be provided by a user as an input. At step 615, the communication adapter receives at least one communication request during the time period. At step 620, the communication adapter processes the at least one communication request received to result into at least one processed data. At step 625, the communication adapter determines if at least one condition is satisfied. The conditions may be pre-defined. If at least one condition is satisfied at step 625, then, at step 630, the communication adapter generates a packet comprising the at least one processed data corresponding to the at least one communication requests received. The processed data corresponds to the communication requests which have been received and processed by the communication adapter. If none of the conditions are satisfied at the step 625, then the steps 615 to 625 are repeated. At step 635, the packet generated is delivered to an EIS (e.g., the EIS 85 in FIG. 4). At step 640, the process ends.

The embodiments described herein enable in increasing the performance of the communication adapter. The communication adapter does not deliver the processed data corresponding to a communication request to the EIS on the receipt on the communication request. Since, the communication adapter waits for the waiting time period, plurality of communication requests are received, processed, and the processed data corresponding to the communication requests are delivered to the EIS as a packet. This increases the ability of the communication adapter to handle increased number of communication requests within a given time interval as the communication adapter does not communicate with the EIS with respect to each communication request. The reduction in the frequency of communication with the EIS achieves in increasing the performance of the communication adapter and the communication adapter is able to handle increased number of transactions within a given time interval.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for managing outbound transactions in a computing environment, the computer program product comprising a non-transitory computer readable storage medium having program code embodied therewith, the program code being readable and executable by a processor to perform a method comprising:
   receiving at least one communication request during a pre-defined time period;
   processing the at least one communication request received to result in at least one processed data;
   in response to satisfying at least one pre-defined condition, generating a packet comprising the at least one processed data corresponding to the at least one communication request received, wherein the at least one pre-defined condition comprises a time period of waiting for a current cycle being greater than a threshold time period, a summation of sizes of the at least one processed data being greater than a threshold size, and the pre-defined time period for a current cycle having expired;
   updating the pre-defined time period of the current cycle as a function of an immediate preceding cycle, wherein the function is:

$$T_w = T_{w-1} + \delta$$

where $T_w$ is a time period of waiting of a current cycle, $T_{w-1}$ is a time period of waiting of the immediate preceding cycle, and $\delta$ is a value by which the time period $T_{w-1}$ is to be incremented, wherein each subsequent iteration of $T_w$ increases in temporal length relative to a current iteration of $T_w$;
   determining if the pre-defined time period of the current cycle is greater than the threshold time period;
   determining if the summation of sizes of the at least one processed data is greater than the threshold size; and
   determining if the pre-defined time period of the current cycle has expired;
   in response to the pre-defined time period of the current cycle being greater than the threshold time period, determining the at least one pre-defined condition is satisfied and processing said at least one communication request during a time period that a communication adapter used to handle said at least one communication request is waiting;
   resetting the pre-defined time period to a value assigned initially; and
   delivering the packet to an enterprise information system (EIS) within the computing environment.

2. The computer program product of claim 1, wherein the packet is delivered to the EIS through asynchronous communication.

3. The computer program product of claim 1, wherein the method further comprises:
   in response to a quantity of communication requests received during the time period $T_{w-1}$ being less than a predetermined quantity, assigning a value of $\delta$ to a value that is above a predefined value.

4. The computer program product of claim 1, wherein the method further comprises:
   in response to a quantity of communication requests received during the time period $T_{w-1}$ being more than a predetermined quantity, assigning a value of $\delta$ to a value that is below a predefined value.

5. A computer system comprising:
   a processor, a computer readable memory, and a non-transitory computer readable storage medium;
   first program instructions to receive at least one communication request during a pre-defined time period;

second program instructions to process the at least one communication request received to result in at least one processed data;

third program instructions to, in response to satisfying at least one pre-defined condition, generate a packet comprising the at least one processed data corresponding to the at least one communication request received, wherein the at least one pre-defined condition comprise a time period of waiting for a current cycle being greater than a threshold time period, a summation of sizes of the at least one processed data being greater than a threshold size, and the pre-defined time period for a current cycle having expired;

fourth program instructions to update the pre-defined time period of the current cycle as a function of an immediate preceding cycle, wherein the function is:

$$T_w = T_{w-1} + \delta$$

where $T_w$ is a time period of waiting of a current cycle, $T_{w-1}$ is a time period of waiting of the immediate preceding cycle, and $\delta$ is a value by which the time period $T_{w-1}$ is to be incremented, wherein each subsequent iteration of $T_w$ increases in temporal length relative to a current iteration of $T_w$;

fifth program instructions to determine if the pre-defined time period of the current cycle is greater than the threshold time period;

sixth program instructions to determine if the summation of sizes of the at least one processed data is greater than the threshold size; and seventh program instructions to determine if the pre-defined time period of the current cycle has expired;

eighth program instructions to, in response to the pre-defined time period of the current cycle being greater than the threshold time period, determine the at least one pre-defined condition is satisfied and process said at least one communication request during a time period that a communication adapter used to handle said at least one communication request is waiting;

ninth program instructions to reset the pre-defined time period to a value assigned initially; and tenth program instructions to deliver the packet to an enterprise information system (EIS) within the computing environment; and wherein the first, second, third, fourth, fifth, sixth, seventh, eighth, ninth, and tenth program instructions are stored on said computer readable storage media for execution by said processor via said computer readable memory.

6. The computer system of claim 5, further comprising:
eleventh program instructions to, in response to a quantity of communication requests received during the time period $T_{w-1}$ being less than a predetermined quantity, assign a value of $\delta$ to a value that is above a predefined value; and wherein the eleventh program instructions are stored on said non-transitory computer readable storage media for execution by said processor via said computer readable memory.

7. The computer system of claim 5, further comprising:
eleventh program instructions to, in response to a quantity of communication requests received during the time period $T_{w-1}$ being more than a predetermined quantity, assign a value of $\delta$ to a value that is below a predefined value; and wherein the eleventh program instructions are stored on said non-transitory computer readable storage media for execution by said processor via said computer readable memory.

* * * * *